United States Patent [19]

Greiner et al.

[11] 3,751,707

[45] Aug. 7, 1973

[54] SWEEP DEFLECTION LINEARIZATION CIRCUIT

[75] Inventors: Hermann Greiner; Wolfgang Lerch, both of Darmstadt, Germany

[73] Assignee: Fernsch GmbH, Darmstadt, Germany

[22] Filed: Nov. 1, 1971

[21] Appl. No.: 194,430

[30] Foreign Application Priority Data

Oct. 31, 1970 Germany ................ P 20 53 511.9

[52] U.S. Cl. ........................................ 315/27 TD

[51] Int. Cl. ........................................ H01j 29/70

[58] Field of Search .................... 315/27 R, 27 GD, 315/28, 29

[56] References Cited

UNITED STATES PATENTS

| | | | |
|---|---|---|---|
| 2,900,565 | 8/1959 | Moore | 315/27 R |
| 3,319,111 | 5/1967 | Denton | 315/27 R |
| 3,293,486 | 12/1966 | Nicholson | 315/27 R |
| 3,192,433 | 6/1965 | Schneider | 315/27 GD |

*Primary Examiner*—Carl D. Quarforth
*Assistant Examiner*—J. M. Potenza
*Attorney*—Carroll B. Quaintance et al.

[57] ABSTRACT

A transistor is switched on and off by pulses, successively completing a circuit through an autotransformer, and completing a series deflection circuit through a tapping of the autotransformer, a capacitance and an inductance. The capacitance is divided in two series-connected capacitors. A resonent oscillator circuit employs the transformer tapping, the adjacent capacitor, and a variable resistor and choke connected between a junction of the capacitors and a junction of the transformer and the transistor.

7 Claims, 2 Drawing Figures

PATENTED AUG 7 1973 3,751,707

SWEEP DEFLECTION LINEARIZATION CIRCUIT

BACKGROUND OF THE INVENTION

The invention relates to a circuit for correcting the deflection current path of a transformer sweep circuit with low-resistance controlled switch, and is particularly concerned with simplifying a known solution in such a way that if necessary it can be easily and cheaply fitted on finished circuits.

German Pat. Specification No. 1,214,723 has already disclosed a circuit for the linearization of the current path in the deflection coils of a transformer sweep circuit with low-resistance controlled switch. An oscillator circuit of adjustable damping and resonance frequency is inductively coupled in the deflection circuit in series with the deflection coils. Power is supplied to the oscillator circuit from the sweep transformer by way of a phase-rotating coupling. This coupling in of a correction circuit produces a compensation operation of variable phase and amplitude. By adjusting the impedances of the oscillator circuit, it is possible to achieve corrections of the exponential function which is normally produced, at the beginning of the forward sweep.

In the known circuit, the oscillator circuit is coupled into the deflection circuit and the main transformer circuit by means of a transformer. In that arrangement, there is either provided an auxiliary transformer in the deflection circuit, or the oscillator circuit is coupled to the sweep transformer by way of a separate winding. It has now been found that that circuit can be simplified, insofar as neither an auxiliary transformer nor an additional winding on the sweep transformer is required.

SUMMARY OF THE INVENTION

The invention provides that, in a circuit for the linearization of the current path in the deflection coils of a transformer sweep circuit, the deflection circuit is coupled to an oscillator circuit of adjustable damping and resonance frequency. Power is supplied to the oscillator circuit from the sweep transformer. In accordance with the invention, the oscillator circuit comprises a choke which is connected to one end of the transformer winding, a resistor following in series with the choke, and a capacitor which forms a part of the separating capacitor lying between the deflection coils and the transformer tapping. With this circuit a considerably improved linearity can be achieved, without additional transformers or additional windings on the main transformer being required. The oscillator circuit is preferably adjusted to about treble the deflection frequency.

BRIEF DESCRIPTION OF THE DRAWING

An embodiment given by way of example of the invention is described in greater detail hereinafter with reference to FIGS. 1 and 2.

DETAILED DESCRIPTION OF THE DRAWING

Figure 1:
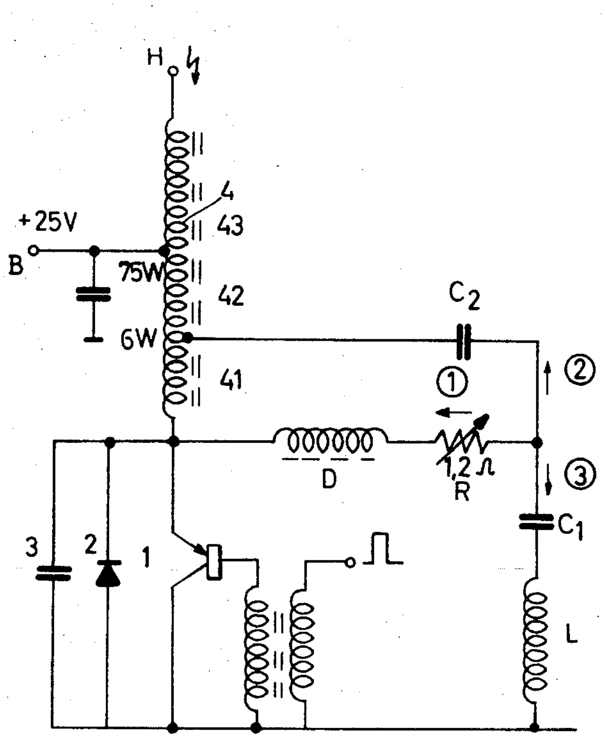
FIG. 1 shows a simplified circuit of a horizontal deflection means.

FIG. 1 shows a known circuit for horizontal deflection, in which the newly included circuit elements are emphasized in darker lines. The circuit comprises a transistor switch 1 with a diode 2 and a storage capacitor 3 lying in parallel. A transformer 4 comprises part windings 41, 42 and 43. The windings 41 and 42 form the primary winding, which is connected to the positive pole of the battery B. The windings 41, 42, 43 form the secondary circuit for high-tension generation. The high-tension pulses can be taken from the terminal H. Finally, the winding 41 is the secondary winding for the deflection circuit, for which capacitors $C_1$ and $C_2$ are combined to form one capacitor.

In the circuit according to the invention, the capacitance C is divided in the form of two correspondingly larger capacitors $C_1$ and $C_2$. The point of connection between the two capacitors is connected to the emitter of the transistor 1 by way of the series circuit of the choke D and the resistor R.

The circuit elements D, R, $C_2$ and the winding 41 form an oscillator circuit, the frequency of which is approximately adjusted to the third harmonic of the deflection frequency. With this circuit, according to the degree of curvature of the deflection current path in the uncorrected circuit, there is compensation of the curvature at the beginning of the forward trace sweep, by means of suitable selection of the resistor R. With this resistor the amplitude of the oscillation can be influenced to any desired extent, so that a substantially linear path of the deflection current, or a deflection current path which is non-linear in the desired manner, can be set in the deflection coils.

Figure 2:
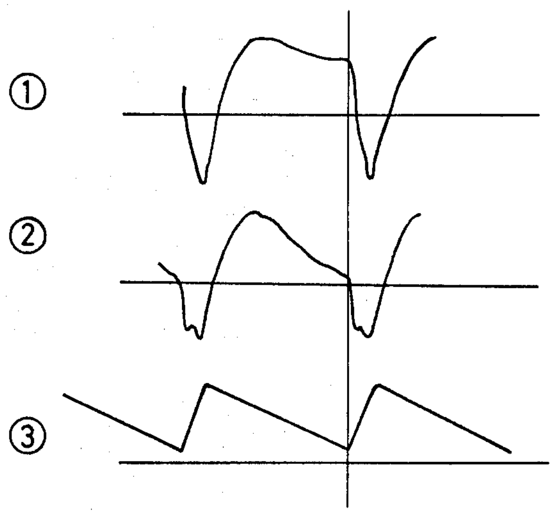
FIG. 2 shows three oscillograms of the current path at a branch point of the circuit.

FIG. 2 shows three oscillograms of the current flowing at the branch point between the capacitors $C_1$ and $C_2$. Subtracting the curve 2 from the curve 1 gives the curve 3 which shows a virtually linear path. In an experimental circuit, good linearization was achieved with circuit elements of the following sizes:

$$C_1 = 6.8\ \mu F$$

$$C_2 = 8\ \mu F$$

$$R = 1.2\ \text{Ohm}$$

$$D = 1.4\ \text{mH}$$

Number of windings of the transformer 4: Portion 41 = six windings, Portions 41 and 42 = eight windings.

While the invention has been particularly shown and described with reference to a preferred embodiment thereof, it will be understood by those skilled in the art that various changes in form and details may be made therein without departing from the spirit and scope of the invention.

What is claimed is:

1. Circuit apparatus for linearization of a deflection current of a transformer sweep circuit for television scanning in the line direction, comprising
- a source of sweep signals,
- a transformer connected to the signal source,
- a low-resistance switch connected to the transformer,
- a source of switching pulses connected to the switch for controlling the switch,
- a deflection circuit having a capacitance connected to a tap on the transformer, the capacitance being connected in series with a deflection coil, the capacitance having two capacitors ($C_1$ and $C_2$), and
- an oscillator circuit closed by a series circuit comprising a choke and a variable resistor, the series circuit being connected to a tap between both capacitors and to the transformer tapping.

2. A circuit according to claim 1, characterized in that the frequency of oscillation of said circuit is adjusted to approximately the third harmonic of the deflection frequency.

3. Line deflection circuit comprising an autotransformer in series with a controlled switching element and a voltage source, a branch having a capacitance, deflection coils connected to a tap of the autotransformer in series with the capacitance, and linearizing means comprising a resonant circuit coupled to the branch comprising the deflection coils, characterized in that said capacitance in series with the deflection coils comprises two capacitors, and an oscillator circuit having a resistor and an inductor connected in series between the end of an autotransformer-switch junction and a junction of said capacitors thereby forming a resonance circuit with the inductor, the resistor, a capacitor and a portion of the autotransformer between the tap and the autotransformer-switch junction.

4. A line deflection sweep circuit comprising a controlled switch having first and second electrodes, an autotransformer connected to the first electrode in series with the switch, a tap connected to the autotransformer, first and second capacitors and a deflection coil respectively connected in series between the tap and the second electrode, and an inductor and variable resistor connected between the first electrode and a point between the first and second capacitors, thereby forming a resonant circuit with the inductor variable resistor, first capacitor and a portion of the autotransformer between the tap and the first electrode.

5. The apparatus of claim 4 wherein the resistor is a variable resistor.

6. The apparatus of claim 4 further comprising a source of control pulses connected to the switch for periodically completing a circuit between the electrodes.

7. The apparatus of claim 4 further comprising a third capacitor and a directional element connected in parallel to the electrodes.

* * * * *